(12) United States Patent
Counterman

(10) Patent No.: US 7,475,544 B2
(45) Date of Patent: Jan. 13, 2009

(54) EFFICIENCY IMPROVEMENT FOR A UTILITY STEAM GENERATOR WITH A REGENERATIVE AIR PREHEATER

(76) Inventor: Wayne S. Counterman, 2410 Lewis Rd., Wellsville, NY (US) 14895

( * ) Notice: Subject to any disclaimer, the term of this patent is extended or adjusted under 35 U.S.C. 154(b) by 415 days.

(21) Appl. No.: 11/265,484

(22) Filed: Nov. 2, 2005

(65) Prior Publication Data

US 2006/0090468 A1    May 4, 2006

Related U.S. Application Data

(60) Provisional application No. 60/624,771, filed on Nov. 2, 2004.

(51) Int. Cl.
*F01K 7/34* (2006.01)
(52) U.S. Cl. .......................... 60/653; 60/670
(58) Field of Classification Search .................. 60/645, 60/653, 670
See application file for complete search history.

(56) References Cited

U.S. PATENT DOCUMENTS

| | | | | |
|---|---|---|---|---|
| 4,483,391 A | * | 11/1984 | Gilbert | 165/134.1 |
| 5,160,539 A | * | 11/1992 | Cochran | 106/405 |
| 6,089,023 A | | 7/2000 | Anderson | |
| 6,328,094 B1 | * | 12/2001 | Mori et al. | 165/8 |
| 6,581,676 B2 | * | 6/2003 | Fierle et al. | 165/9 |
| 6,640,752 B1 | | 11/2003 | Counterman | |
| 7,278,378 B2 | * | 10/2007 | Counterman | 122/1 A |

* cited by examiner

*Primary Examiner*—Hoang M Nguyen
(74) *Attorney, Agent, or Firm*—Kloss, Stenger & LoTempio; Vincent G. LoTempio

(57) ABSTRACT

A steam generator system comprising a coal-fired steam generator in fluid communication with a regenerative air preheater. The steam generator being adapted to receive a flow of heated combustion air exiting from the regenerative air preheater and to discharge a flow of hot flue gas to the regenerative air preheater. The regenerative air preheater adapted to receive a flow of cool air in counter flow to the flow of hot flue gas and to provide a heat exchange between the cool air and the hot flue gas to convert the cool air into the heated combustion air exiting to the steam generator. The steam generator system further comprising a first flow of heated air, diverted from the flow of heated combustion air, and routed through a source of pulverized coal to form a mixture comprising heated air and pulverized coal. The mixture being directed, by means of a fan positioned downstream of the source of pulverized coal, to the steam generator for combustion therein. A recycle fluid flow of heated air, diverted from the flow of heated combustion air and directed by means of a fan to re-enter the regenerative air preheater at a location substantially separate from where the flow of cool air is received in the regenerative air preheater to be further heated therein and exit as the flow of heated combustion air.

18 Claims, 13 Drawing Sheets

EFFICIENCY IMPROVEMENT FOR A UTILITY STEAM GENERATOR WITH A REGENERATIVE AIR PREHEATER

This application claims priority of U.S. Provisional Patent Application 60/624,771, filed on Nov. 2, 2004, titled: EFFICIENCY IMPROVEMENT FOR A UTILITY STEAM GENERATOR WITH A REGENERATIVE AIR PREHEATER.

BACKGROUND OF THE INVENTION

Field of the Invention

The present invention relates to the field of coal-fired steam generators, and more particularly to a power output increase and efficiency improvement for a coal-fired utility steam generator with a regenerative air preheater.

Many coal-fired utility steam generators are limited in the amount of electric energy they can produce due to insufficient heat to dry high moisture coal. This output limitation can occur only during specific weather or fuel conditions, or may exist for all or the majority of the utility operating hours. Powder River Basin or PRB coal, and lignite coals have high moisture content. PRB coals are now used at many facilities not initially designed to fire that coal. The original system design cannot provide a primary air temperature high enough to dry the PRB coal in the amount needed to produce the amount of steam the generator is capable of generating. The thermal drying capacity of the primary air serving the coal pulverizers is not large enough to dry all the coal needed. Additional thermal capacity cannot be added by increasing the mass flow as undesirable impacts occur from the higher velocity. When the velocity of the primary air flow gets too high within the pulverizer, it can sweep coarse coal particles out of the pulverizer. Coarse particles do not completely burn and the negative result is wasted fuel. Also, the particles not completely burned become part of the fly ash collected within the emissions control device. Coarse coal particles can render the fly ash unsaleable for use in concrete.

The additional thermal capacity must come from a higher temperature. No economical means are available to increase the drying capacity. Thus the state of the art is clearly not ideal and there is a need for a means to increase the drying/thermal capacity for a steam generator with a regenerative air preheater.

Due to environmental concerns with the impact of acid rain, many coal fired power plants have installed scrubbers to remove the sulfur oxides from the combustion gases. An alternative selected by others is to switch from a higher sulfur coal to a low sulfur coal such as Powder River Basin or PRB coal. Some of these units also use a scrubber, but the amount of scrubbing reagent and produced byproducts are lower than for high sulfur fuels. PRB coals have high moisture content. Combustion of PRB coal in boilers not specifically designed for such coal often creates fouling of some of the water and steam tubes within the boiler and the backpass. Due to these impacts, an undesired side effect in switching a plant from the original design coal to PRB is an increase in the gas temperature leaving the boiler. This higher temperature going to the regenerative air preheater results in a higher air preheater gas outlet temperature (reduction in boiler efficiency). Weight constraints and space constraints within the existing regenerative air preheater limit increasing its thermal efficiency. Also the PRB high moisture content increases the heat capacity of the flue gas limiting the amount of energy the required combustion air can recover.

Many of the existing installed regenerative air preheaters were originally sized and designed for low gas side effectiveness. The definition of effectiveness, method of calculation and discussion of typical values has been covered in U.S. Pat. No. 6,089,023 to Anderson, et al. The incremental amount of element depth that can be retrofitted to increase the effectiveness is rather small. Typically there is little depth to add element. The structural weight limitations, such as of the support bearing, limit using elements with greater surface area (and weight) per cubic foot. While it would be possible to use a higher surface area per cubic foot if it was not as thick as the element it replaced, the reduction in life from factors such as corrosion, fatigue due to cyclic motion, fatigue and fracturing due to soot blowing and other factors typically makes this uneconomical. Fouling and plugging of smaller passageways is also a consideration which would limit using a higher surface area element.

As boilers age over time, many holes or leakage paths are created in the furnace and ductwork. Most boilers operate under a slight negative pressure in the furnace, with the pressure in the flue gas exhaust path becoming increasingly negative as the gas flows from the furnace to the induced draft gas fan. These conditions increase the amount of gas flow entering the regenerative air preheater. This increases the gas flow heat content or capacity-rate (see U.S. Pat. No. 6,089,023 to Anderson, et al. for discussion of capacity-rate). All heat exchangers are limited in the amount of energy they can recover by the minimum capacity-rate. In utility steam generation, this minimum capacity-rate is the air flow (or combined air flow of primary and secondary flow when two air flows are present). The thermodynamic limitation in a counterflow heat exchanger, is that once the minimum capacity-rate flow reaches an outlet temperature equal to that of the other flow, no more heat can be transferred. The increased gas side capacity-rate therefore can only result in a higher gas outlet temperature and more energy wasted by discharge up the stack.

One means to reduce this energy waste has been achieved by increasing the amount of air flow going through the regenerative air preheater. In U.S. Pat. No. 6,089,023 to Anderson, et al. the inventors directly address the use of excess air to reduce the exit gas temperature leaving a coal fired boiler to improve operation of a particulate collection device, and in some embodiments to recover additional energy. But because the rotation of the regenerative air preheater carries some entrained dirty gas to the air side, and the presence of some condensation and re-evaporation cycles of some pollutants, this air stream is polluted and typically cannot be discharged directly to the atmosphere.

U.S. Pat. No. 6,640,752 to Counterman also describes the use of excess air used to reduce the gas temperature leaving the air preheater to achieve a desired further condensation of sulfur trioxide.

However, in each of these above listed patents a greater air flow than required for combustion is provided by the combustion air fan. The fan must have additional capacity (or be so modified) to provide the excess or additional air flow above that is required for combustion. The excess air is either 1) exhausted directly to the atmosphere, thereby adding additional pollutants, 2) exhausted indirectly to the atmosphere via mixing with the cleaned flue gas, again thereby adding additional pollutants, or 3) it is "cleaned" by routing through an additional particulate removal device which is costly and since not 100% efficient also adds pollutants to the plant emissions. There is a fourth option, adding the excess air to the dirty flue gas but it typically is not feasible as the existing particulate control devices cannot handle additional flow and would significantly increase emissions. Each of these methods of dealing with excess air can be characterized as open loop systems.

In U.S. Pat. No. 6,089,023 to Anderson, et al., it is taught that during operation a specific amount of air flow is required by the combustion system. The regenerative air preheater has an air outlet flow equal to that required by the combustion system, plus the "excess" air. At steady state, the system is exhausting to atmosphere the same quantity of air as the "excess air" and the combustion products. One of the problems in this type of device is the discharge of pollutants directly to the atmosphere.

Thus it is readily apparent that there is a longfelt need for improved systems and means of operation which reduce energy waste without generating additional emissions.

SUMMARY OF THE INVENTION

It is accordingly a primary object of the present invention to provide an improved steam generator system.

It is another object of the present invention is to provide an improved steam generator system that eliminates the continuous excess air discharge and it's emissions to the environment and for a steam generator system that uses a recycle fluid flow wherein some air exiting the regenerative air preheater is routed to the inlet of the regenerative air preheater.

A further object of the present invention to provide a means wherein energy currently not recovered from utility steam generators is captured by the regenerative air preheater.

Another further object of the invention is to provide a steam generator system with a closed loop system with specific features that are thermodynamically beneficial.

It is a further object of the present invention to provide an improved steam generator system wherein otherwise waste energy may be recovered and utilized.

Another object of the present invention is to introduce the recycle fluid flow at a location within the element sheets that first leave or rotate from the flue gas side of the regenerative air preheater so as to produce a minimal reduction in the temperature difference or head between the gas and air flows.

Yet another object of the present invention is to provide an improved steam generator system that increases thermal energy for coal drying while recovering thermal energy.

These and other objects are achieved in accordance with the present invention which provides a steam generator system that comprises a coal-fired steam generator in fluid communication with a regenerative air preheater. The steam generator is adapted to receive a flow of heated combustion air exiting from the air preheater and to discharge a flow of hot flue gas to the air preheater. In the preheater, a flow of air is heated by heat exchange with a counter flow of hot flue gas exiting from the steam generator. The flow of air, now heated by the heat exchange, exits the air preheater as heated combustion air and is routed to the steam generator. A portion of the heated combustion air is diverted to form a separate flow of hot air directed through a source of pulverized coal to form a mixture of heated air and pulverized coal. This mixture is routed to the steam generator for combustion therein. The flow of the mixture to the steam generator may be assisted by the aid of an exhauster fan between the source of pulverized coal and the steam generator. In another embodiment, utilizing two air preheaters, an air fan, providing incoming air to one of the preheaters, may provide additional positive pressure to the exiting air stream in communication with the pulverizer. In still another embodiment, a trisector preheater may be employed providing a rotor in contact with primary air flowing to the pulverizer, and secondary combustion air going to the boiler.

In any embodiment, using any type of preheater, a portion of heated air is diverted from the flow of heated combustion air to form a recycle fluid flow which may be directed by means of a fan to re-enter the air preheater at a location substantially separate from where the flow of cool air is received in the regenerative air preheater to be further heated therein and exit as the flow of heated combustion air to the steam generator either via the pulverizer or directly to the boiler. Thus, the recycle fluid flow is used to control, especially to increase, the overall heat content of the flow of heated combustion air exiting to the steam generator and resulting in overall higher energy efficiency for the system and an increased coal drying capacity of the pulverizer.

Furthermore, in a preferred embodiment, the recycle fluid flow is routed through a heat extraction device, such as a heat exchanger, for additional utilization of the heat energy contained therein, for example, by transfer to a lower temperature fluid, for electrical power generation, or other purpose. In one such embodiment, heat energy may be transferred to a liquid, such as toluene, or a thermal fluid which, in turn may be utilized for other purposes. On exiting the heat extraction device, the recycle fluid flow may then be directed to re-enter the air preheater to be further heated therein and exit as the flow of heated combustion air to the steam generator.

Additional objects and advantages will become apparent and a more thorough and comprehensive understanding may be had from the following description and claims taken in conjunction with the accompanying drawings forming a part of this specification.

DETAILED DESCRIPTION OF THE INVENTION

Figure 1:
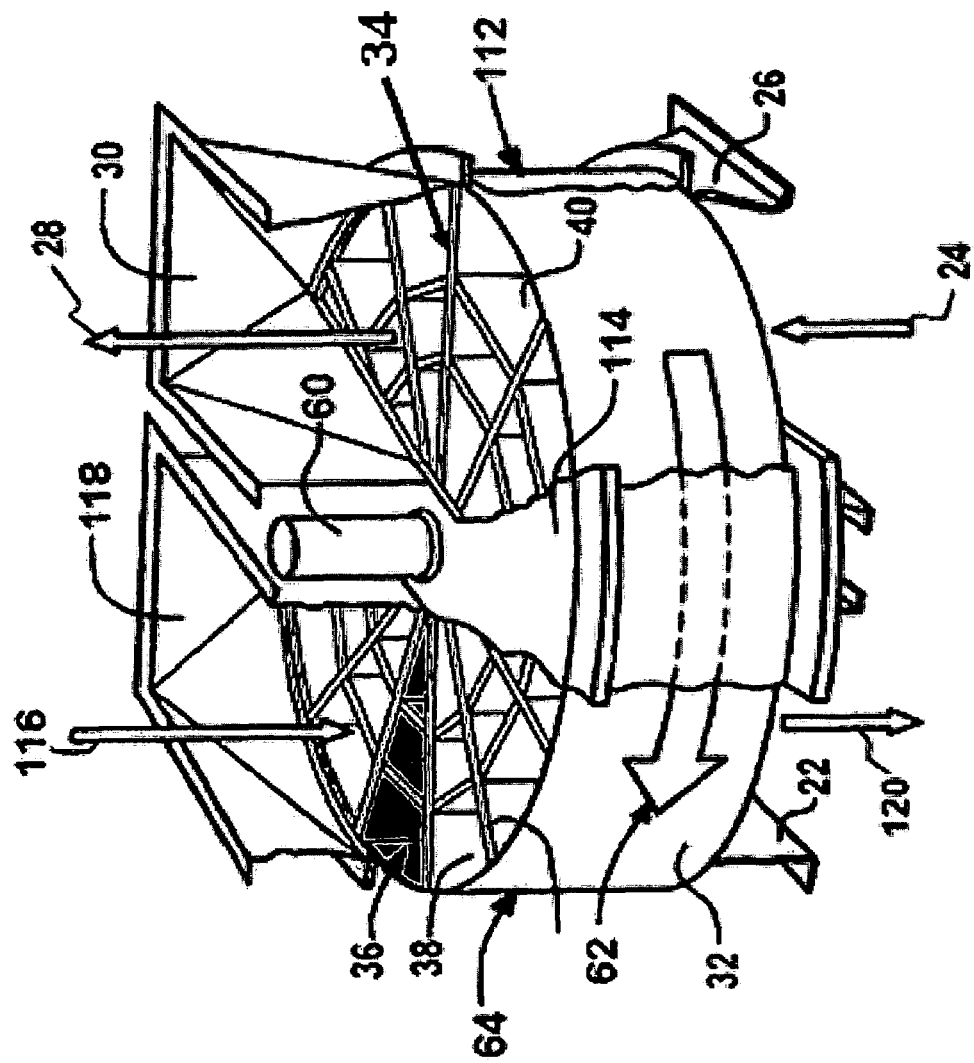
FIG. 1 is a generalized perspective view of a conventional art typical bisector regenerative air preheater.

This application claims priority of U.S. Provisional Patent Application 60/624,771, filed on Nov. 2, 2004, titled: EFFICIENCY IMPROVEMENT FOR A UTILITY STEAM GENERATOR WITH A REGENERATIVE AIR PREHEATER.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. §112.

Currently in the coal-fired steam generators industry there are thousands of pre-existing steam generators using a regenerative air preheater. Bisector and trisector air preheaters are often utilized for coal fired boilers. A problem in the industry is that many coal-fired utility steam generators are limited in the amount of electric energy they can produce due to insufficient heat to dry high moisture coal. The additional thermal capacity must come from a higher temperature and no economical means are available to increase the drying capacity. Thus the state of the art is clearly not ideal and there is a need for a means to increase the drying/thermal capacity for a steam generator with a regenerative air preheater.

Adverting now to the drawings, FIG. 1 is provided as an example of a bisector air preheater system commonly used in many coal-fired steam generating plants. FIG. 1 illustrates a partially cut-away perspective of a bisector air preheater with vertical shaft orientation 60. A drive motor, not shown, provides rotation (rotation arrow 62) of rotor 64 relative to the fixed housing 112. Fixed housing 112 is attached to four ducts, air inlet duct 26, air outlet duct 30, gas inlet duct 118, and gas outlet duct 22. Fixed housing 112 is divided by two sector plates 114. The second sector plate 114 located between the gas inlet duct 118 and the air outlet duct 30 is mostly obscured by those ducts. The bottom of the preheater contains a corresponding sector plate 114 (not shown). This type of regenerative air preheater is commonly known as a bisector air preheater since there are two flow streams separated by sector plate 114. Gas inlet flow 116 enters the top of the air preheater through gas inlet duct 118, with the gas outlet flow 120 leaving via gas outlet duct 22. Gas inlet flow 116 consists of the products of combustion of the fuel burned in the boilers, typically including the particulate or ash when a solid fuel such as a coal is burned in the boiler. Gas inlet flow 116 is the hottest of the four flows which go through the rotor.

Typically the flow arrangement is counterflow with the air inlet flow 24 entering air inlet duct 26 and air outlet flow 28 exiting via air outlet duct 30. Air outlet flow 28 is the second hottest flow. The thermal effectiveness of the regenerative air preheater increases as the temperature of air outlet flow 28 approaches the temperature of gas inlet flow 116. The portion of the rotor in flow communication with air inlet flow 24 and air outlet flow 28 is termed air side 29 (shown in FIG. 3). The portion of the rotor in flow communication with the gas inlet flow 116 and gas outlet flow 120 is termed gas side 21 (shown in FIG. 3). Since the rotor rotates, all parts of the rotor move through both air side 29 and gas side 21 during the course of its rotation.

Rotor 64 consists of an outer shell 32 and is divided into a number of pie shaped compartments by a plurality of diaphragms 34. These diaphragms 34 extent radially from outer shell 32 to a post (not shown) which is connected to the vertical shaft. Each pie shaped compartment is termed a sector 36 which is further subdivided into generally trapezoidally-shaped compartments 38 by stay plates 40 which provide structural support to the assembly. Not shown but present in each of the trapezoid compartments are heat transfer elements, generally packaged within baskets to facilitate quick replacement of elements which have become thin, plugged or otherwise reached end of life. Heat transfer elements are typically made of metal in thicknesses of 0.049" to 0.019". Typical materials are carbon steel or low alloy corrosion steel. Special coatings such as porcelain enamel are used to provide increased corrosion resistance typically for the cold end. The cold end of the air preheater is that portion wherein air inlet flow 24 enters and gas outlet flow 120 exits. The hot end of the air preheater is that portion where gas inlet flow 116 enters and the air outlet flow 28 exits.

Figure 2:
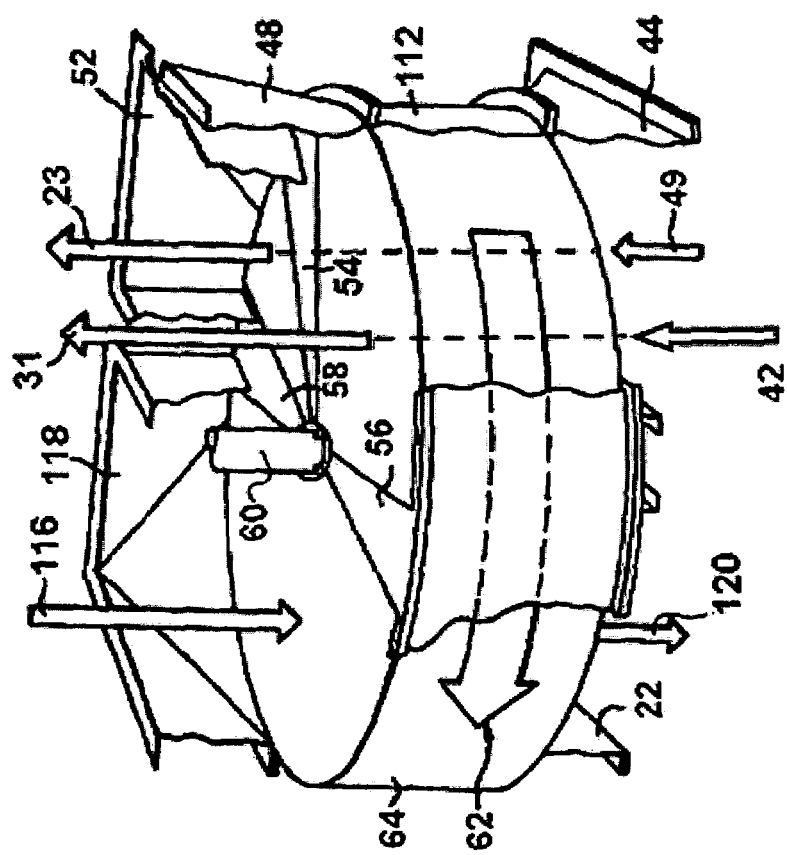
FIG. 2 is a generalized perspective view of a conventional art typical trisector regenerative air preheater.

FIG. 2 illustrates a partially cut-away perspective of a conventional trisector air preheater commonly used in many coal-fired steam generating plants. The trisector air preheater of FIG. 2 has a vertical shaft orientation 60 in which a drive motor (not shown) provides rotation (rotation arrow 62) of rotor 64 relative to fixed housing 112. The trisector air preheater has two distinct air streams operating at different pressures. The lower pressure and higher mass flow stream is typically called secondary air flow 31. Secondary air inlet flow 42 enters secondary air inlet duct 44 providing flow communication with the rotor and heat transfer elements. After flowing over the heat transfer elements within the portion of rotor that were located within the secondary air side 45 (shown in FIG. 12), the heated secondary air flow 31 exits through secondary air outlet duct 48.

When a trisector air preheater is used, the primary air is always at higher pressure than the secondary air and most typically a smaller volume flow rate; hence it uses a smaller percentage of the available air side sectors than the secondary air. Primary air inlet flow 49 flows through rotor 64 in the primary air side 51 (shown in FIG. 12) and over the elements, with primary air flow 23 exiting via primary air outlet duct 52. The primary air flow is used to both dry the coal, and transport it to the burners. There are three sector plates required to separate the two air streams from each other and from the flue gas stream. PS sector plate 54 separates the higher pressure primary air from the secondary air. SG sector plate 56 separates the secondary air from the flue gas. PG sector plate 58 separates the primary air from the flue gas. Three corresponding sector plates are located on the bottom of the fixed housing, similarly separating the three streams (not shown). The rotation direction shown, gas side to primary air side, is most typically utilized as this provides the hottest primary air temperature. The opposite rotation is used in some small population of units.

Figure 3:
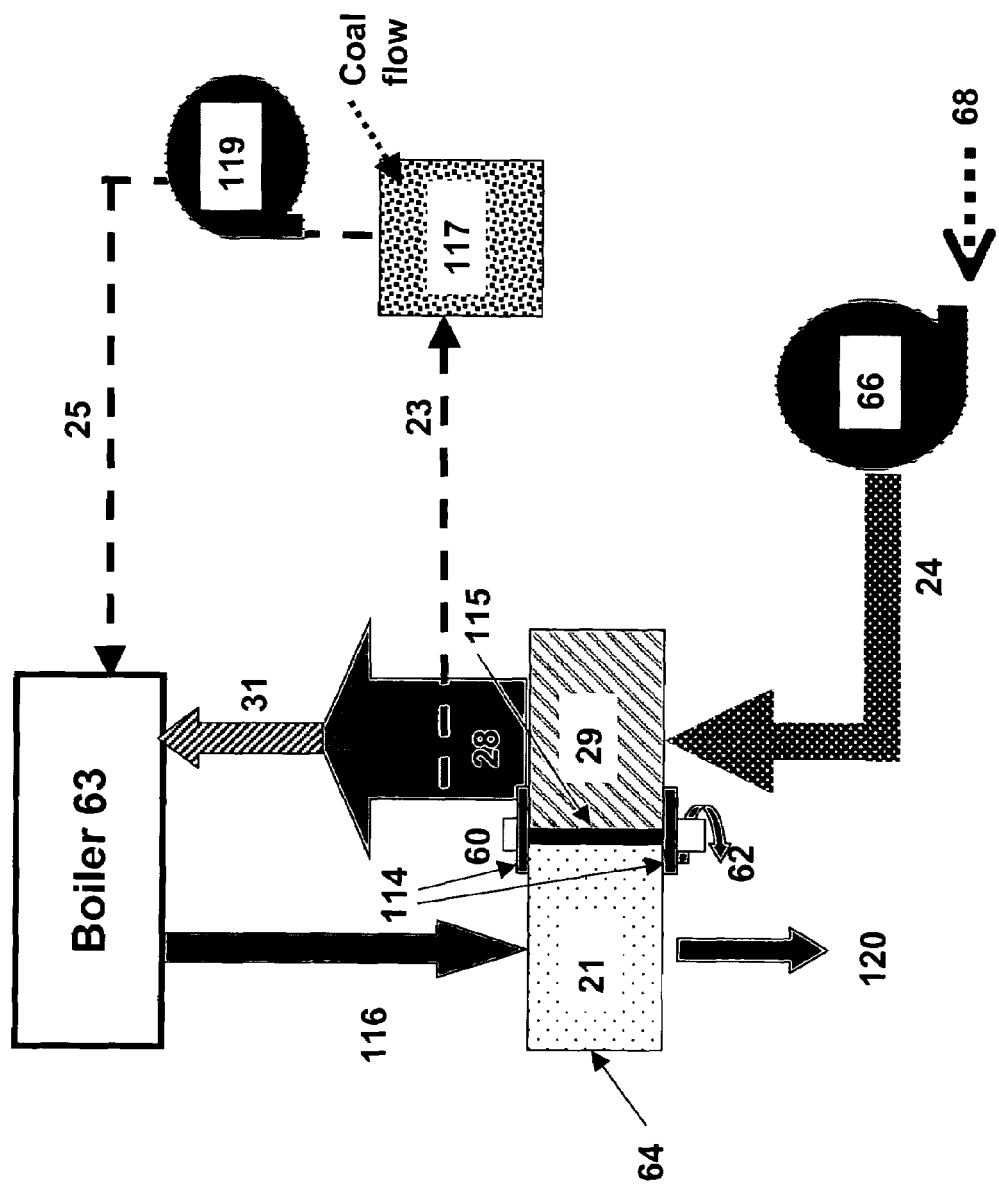
FIG. 3 is a flow schematic showing a conventional art boiler utilizing a bisector air preheater and pulverizer exhauster fan.

FIG. 3 is a flow schematic including a bisector air preheater system typically used in coal-fired steam generating plants. FIG. 3 shows a flow schematic for a boiler system which utilizes a bisector air preheater to provide both secondary air flow 31 and primary air flow 23. On large boilers more than one preheater can be used. Pulverizer 117 in this system operates at a slight negative pressure. Combustion air fan 66 provides flow of combustion air 68. As with the air preheater, more than one such fan can be used if size dictates, but they will be essentially identical in design and function. Combustion air fan 66 creates a positive pressure and provides a flow of cool air (air inlet flow 24) to rotor 64. The rotor transfers heat from gas side 21 to air side 29 and air outlet flow 28 exits the rotor as a flow of heated combustion air. In addition to sector plates 114, at least one other sealing system is utilized to substantially separate air side 29 from gas side 21 such as axial seal 115, or circumferential seal (not shown). By nature of the rotation of the rotor, the temperature of air outlet flow 28 is not uniform above rotor 64 on air side 29. A subset of the hotter portion of the air outlet flow 28 is removed from a location downstream of the rotor and induced to flow to pulverizer 117 by pulverizer exhauster fan 119. Upon leaving air outlet duct 30, this subset becomes primary air flow 23, and is the flow that both dries the coal and transports it to the burners of boiler 63. The remainder of air outlet flow 28, becomes secondary air flow 31, and goes to the burners of boiler 63 to complete combustion. The system shown in FIG. 3 is coal-fired bisector air preheater system typically used in coal-fired steam generating plants with an utility steam generator that is limited in the amount of electric energy it can produce due to insufficient heat to dry high moisture coal.

Figure 4:
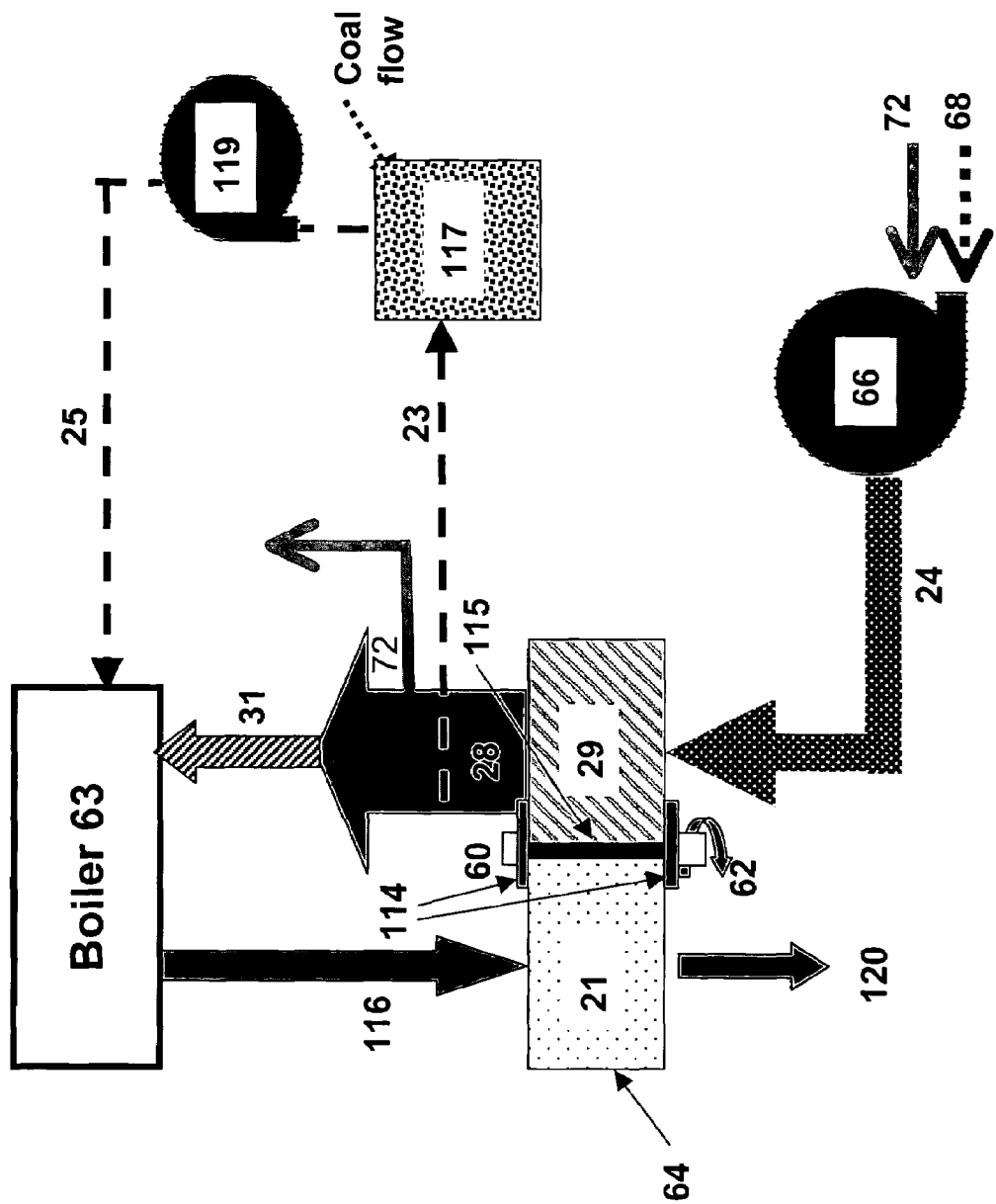
FIG. 4 is a flow schematic showing a conventional art utilization of excess air.

FIG. 4 is a flow schematic showing another typical arrangement that is used in coal-fired steam generating plants wherein the excess air is conventionally used as applied to a bisector air preheater. Rotor 64 receives a flow of hot flue gas (gas inlet flow 116) from boiler 63. As the rotor rotates, the element sheets within the rotor absorb heat while in gas side 21, and give off heat while in air side 29, thereby decreasing the gas in flow temperature, and increasing the temperature of the air inlet flow 24. In addition to sector plates 114, at least one other sealing system, axial seal 115 is utilized to substantially separate air side 29 from gas side 21. All air flow going to the air preheater rotor goes through combustion air fan 66, which increases the pressure of combustion air flow 68. Air inlet flow 24 is equal to the normal amount of combustion air 68 plus the excess air flow 72. The excess air component of air inlet flow 24 cannot be distinguished from combustion air 68, as it has the same pressure, temperature, and chemical make-up. It has not been constrained or otherwise held separate. After passing through rotor 64, the normal quantity of hot air outlet flow goes to the boiler 63, and excess air flow 72 is discharged to atmosphere. Such discharge may include the step of routing it through a particulate control device. U.S. Pat. No. 6,089,023 teaches the benefits of using this excess air, and various intermediate emissions removal steps it may undergo prior to discharge, but in all instances it is eventually discharged to atmosphere. There are two fluid streams discharged from the utility steam generator or boiler, gas outlet flow 120 and excess air flow 72.

On a coal fired steam generator or boiler with one combustion air fan 66, the air required to both transport the fine ground coal particles and to dry the coal is taken from the air outlet flow 28. Since only a portion of the total air is required for the pulverizer, a subset or part of the air flow 28 is removed or taken. Further since this primary air flow 23 must dry the coal, the air portion removed is typically taken from the hottest portion of the air outlet duct or a duct immediately downstream from the air outlet duct. This is the location where the elements have just rotated from gas side 21 into air side 29. Pulverizer exhaust flow 25 comprises primary air flow 23, plus the coal ground in the pulverizer, and the moisture driven off the coal by the heat of primary air flow 23. Pulverizer exhaust flow 25 goes to the boiler and is ignited in the burners (not shown) and partial combustion occurs. Secondary air flow 31 is the remainder of the flow of heated combustion air and is introduced downstream of the ignition point and combustion is completed. The regenerative air preheater as shown in FIG. 4 has an air outlet flow equal to that required by the combustion system, plus the "excess" air. At steady state, the system is exhausting to atmosphere the same quantity of air as the "excess air" and the combustion products. One of the problems in this type of device is that there is discharge of pollutants directly to the atmosphere and it reduces the drying capacity of the pulverizer.

Figure 5:
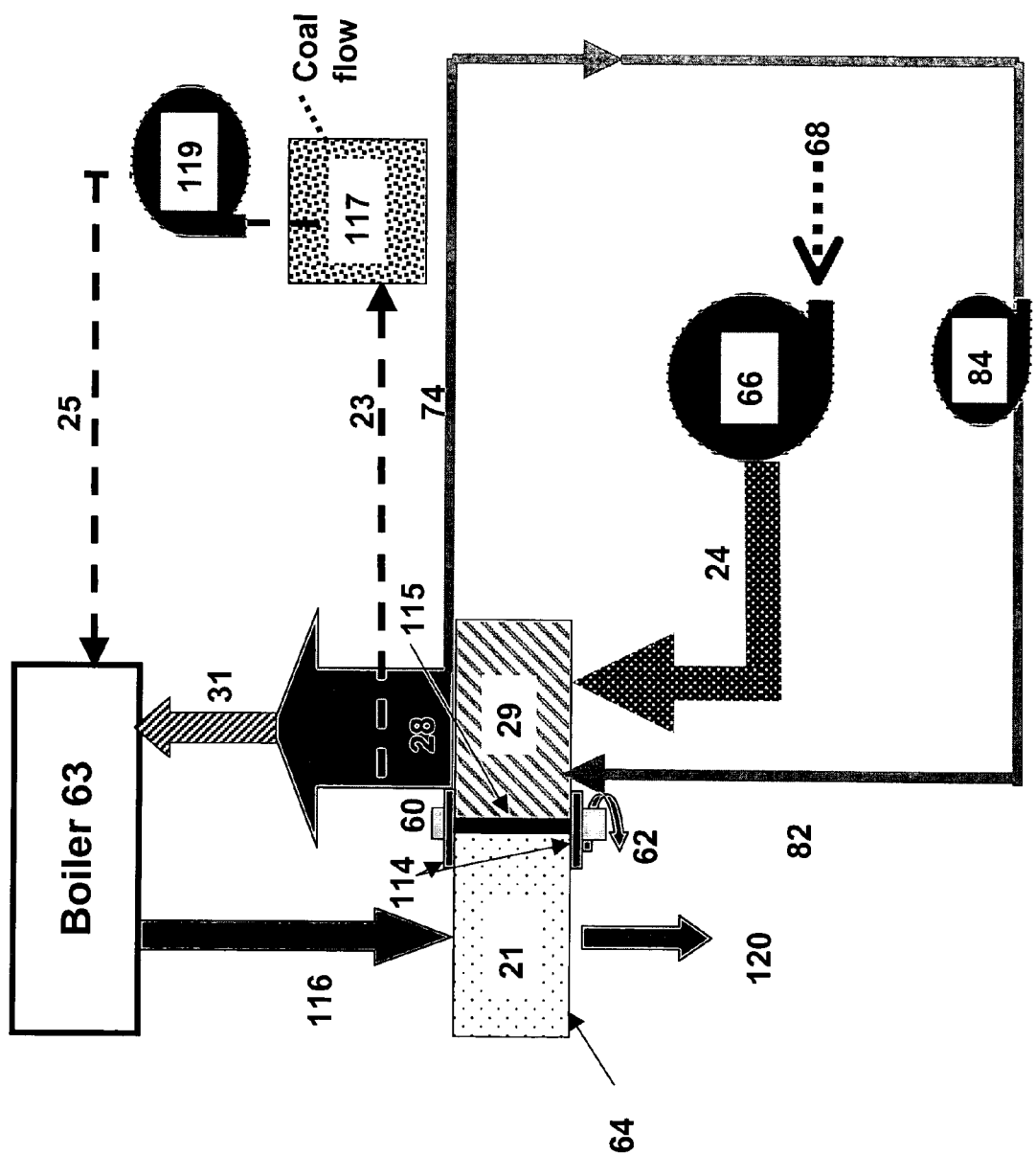
FIG. 5 shows a flow schematic of a preferred embodiment of a closed loop recycle fluid flow system of the present invention applied to a bisector air preheater.

FIG. 5 shows a flow schematic of a preferred embodiment of a closed loop system of the present invention applied to a bisector air preheater. The specific beneficial thermodynamic feature of this embodiment is that it provides an increase in pulverizer drying capacity. A portion of the heated combustion air is diverted to form a separate flow of hot air directed through a source of pulverized coal to form a mixture of heated air and pulverized coal. In this preferred embodiment, at some air side location downstream from the rotor 64, a quantity of flow 74 is removed from air outlet flow 28, or secondary air flow 31 (before it enters the boiler). This portion of the heated combustion air is diverted from the air outlet duct 30 (as shown in FIG. 1), or some downstream location in the air outlet duct 30 between rotor 64 and boiler 63. Flow 74 is ducted to recycle fluid flow fan 84 and it is returned to the air preheater via recycle fluid flow 82 where it is introduced into rotor 64 on air side 29 at a location near where the element sheets first rotate into the air side from the gas side so as to achieve a significant temperature increase in primary air flow 23. Introducing recycle fluid flow 82 at this location provides flow communication to the portion of the air outlet flow where the primary air flow 23 is extracted. Since recycle fluid flow 82 has a significantly hotter temperature than that of the typical air inlet flow, it is not desirable to introduce fluid flow 82 at or near a location where the element sheets are about to rotate into gas side 21. Introducing recycle fluid flow 82 to the elements at their coldest position in the rotation, would increase the temperature of the element sheets prior to their rotation into the flue gas stream and thus the element sheets would not be able to recover the same amount of energy from the flue gas. Further, this location would not provide the desired effect of increasing the temperature of the primary air flow, since the primary air flow is removed from the air preheater air outlet in proximity to the hottest location of the rotor.

Rotor 64 receives a flow of hot flue gas (gas inlet flow 116) from boiler 63. Combustion air 68 is pressurized by combustion air fan 66 and flows to the rotor 64. As rotor 64 rotates, the element sheets within the rotor absorb heat while in gas side 21, and give off heat while in air side 29, thereby decreasing the temperature of gas inlet flow 116, and increasing the temperature of both air inlet flow 24, and recycle fluid flow 82. Recycle fluid flow 82 is directed to re-enter the regenerative air preheater at a location substantially separate from the flow of cool (air inlet flow 24) and the two fluids flows are kept substantially separated such that the temperature of air inlet flow 24 is not significantly increased and the temperature of recycle fluid flow 82 is not substantially reduced. The two flows are heated and exit the hot face of the rotor as a flow of heated combustion air.

Essentially all regenerative air preheaters applied on utility steam generators are rotated in the counterflow arrangement as shown in FIG. 1. The hot face is that with the hottest temperatures which is the rotor face which "sees" the gas inlet flow 116, and air outlet flow 28. Primary air flow 23 consists of the hottest portion of air outlet flow 28 and is routed to pulverizer 117. Primary air flow 23 is hotter than secondary air flow 31 when recycle fluid flow 82 is not present (as shown in FIG. 3). When recycle fluid flow 82 is redirected into the hottest point of the bottom of air side 29 the temperature of the primary air flow 23 is increased. This is true because for both flow cases, the regenerative air preheater recovers about the same fraction or percentage of the temperature head and adds that fraction to the air inlet temperature. The term temperature head refers to the temperature difference between the temperature of gas inlet flow 116 and air inlet flow 24. Since only a fraction of the temperature head is added to the air inlet flow temperature, increasing the air inlet flow temperature, while reducing the temperature head, produces an increase in the air outlet flow temperature. Flow 74 and recycle fluid flow 82 are of equal mass flow, but each will have a somewhat different composition and temperature with flow 74 having a higher temperature than 82. To illustrate, consider a system with air inlet flow 24 at 75° F., and flow 74 equal to the air outlet temperature 689° F. Assume no heat loss to ambient so recycle fluid flow 82 is also 689° F. Further assume recycle fluid flow 82 is 12.5% of air inlet flow 24 and gas inlet flow 116 temperature is 750° F. Note the chosen temperatures and flows were selected to provide direct reference to the example cited in U.S. Pat. No. 6,089,023 to Anderson, et al.

It is should be obvious by those knowledgeable in the field of heat transfer, that when the velocity of flow is increased, the heat transfer coefficient increases. Also understood is that when the heat transfer coefficient is increased, a counterflow regenerative air preheater increases the amount of energy transferred. For simplification, the increase in the heat transfer coefficient will be ignored since in doing so the following example produces conservative numbers.

Also known by those skilled in the art, and as taught in U.S. Pat. 6,089,023 to Anderson, et al., the air side effectiveness ($E_A$) and gas side effectiveness ($E_A$) are related. The relationship dictates that when the total rotor air flow the rotor is increased, an increase in gas side effectiveness occurs, but the air side effectiveness decreases. The air effectiveness ($E_A$) is equal to the air outlet temperature (TAO) minus the temperature of the air inlet (TAI) divided by the temperature head TH, where temperature head is equal to the difference in temperatures between the gas inlet and the air inlet. ($E_A$=(TAO–TAI)/TH). Similarly where TGI is the gas inlet temperature and TGO the gas outlet temperature, $E_G$=(TGI–TGO)/TH). In this example the original air preheater design and flow conditions are such that $E_A$=0.909($E_A$=(689–75)/(750–75) =0.909). The capacity rates are such that $E_G$=0.709. The gas outlet temperature for assumed temperatures and a gas side effectiveness of 0.709, calculates to be 271° F.

Referring to the assumed numbers and these equations consider a first case where the recycle fluid flow 82 is allowed to mix with the air inlet flow 24. If the small impact of the temperature impact to heat capacity is ignored, when 12.5% of fluid at 689° F. is added to a flow at 75° F. the resultant temperature is 143° F. Due to the increased air flow, the air effectiveness is reduced to 0.88. When 143° F. air flow enters an air preheater with an air side effectiveness of 0.88, the air outlet temperature becomes about 677° F. (solving the equation for $E_A$ find TAO (the air outlet temperature). This is a decrease of about 12 degrees in the temperature of air, so the pulverizer drying capacity is actually decreased. The additional air flow produces a decrease in gas outlet temperature 120 of about 2 degrees.

Now consider the system of invention as detailed herein where recycle fluid flow 82 is kept substantially from mixing with air inlet flow 24. The portion of the rotor that "sees" or is exposed to recycle fluid flow 82 at the temperature of 689° F. produces an air outlet temperature of 743° F. for the unmixed portion where pulverizer flow 23 is removed. This is an increase of about 54 degrees in the temperature of air, producing a large increase in pulverizer drying capacity. This is equivalent to a 9% increase in the drying capacity to the pulverizer. The flow weighted air inlet temperature is the same as the mixing temperature 143° F. The gas outlet temperature remains 269° F., or 2 degrees lower that the base case without the closed loop recycle fluid flow 82.

If a heat exchange device is installed for the purpose of reducing the temperature of the recycle fluid flow to 400° F., for example, the air temperature to the pulverizer is increased by about 19° F. from the base case with no recycle fluid flow 82. This is equivalent to a 3% increase in the drying capacity to the pulverizer. However the energy removed from flow 74 is now used productively. One example of how the energy can be used is electric power generation as taught herein. Gas outlet flow 120 now has a temperature of 257° F., or 14 degrees lower than without the preferred embodiment of the closed loop recycle flow system.

Figure 6:
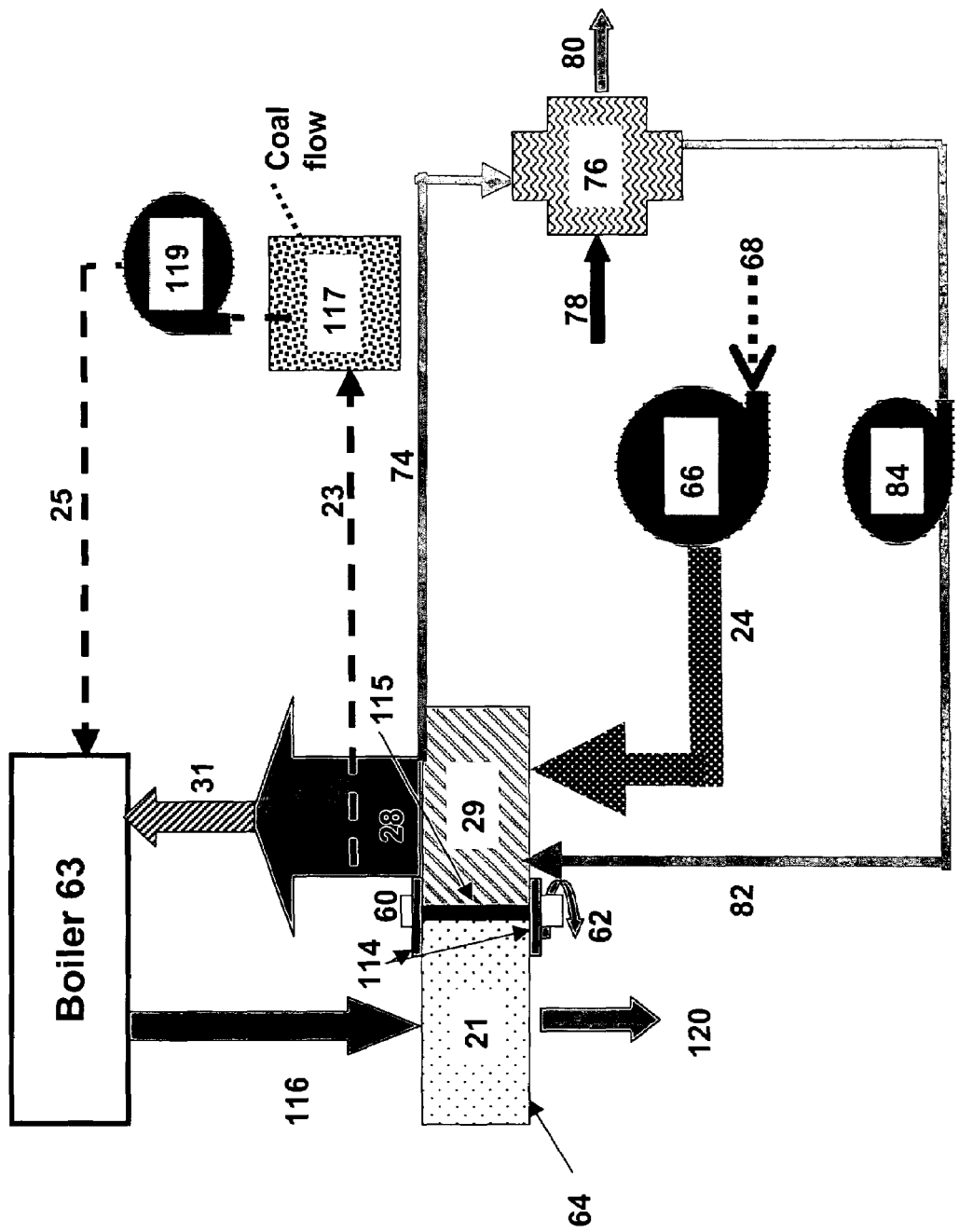
FIG. 6 is a flow schematic showing another embodiment of a closed loop recycle fluid flow system of the present invention applied to a bisector air preheater including additional thermal energy recovery.

FIG. 6 is a flow schematic showing another embodiment of the closed loop system of the present invention applied to a bisector air preheater including additional thermal energy recovery. This additional preferred embodiment provides both increased pulverizer drying capacity and additional thermal energy recovery. Flow 74 is ducted to a heat extraction device 76. The exact type of heat extraction device will depend on the particular needs and economics of each boiler or utility steam generator. Typically a lower temperature fluid 78 will flow through a counterflow or cross flow heat extraction device 76, for example a heat exchanger, and exit as a higher temperature fluid 80 thereby removing energy from flow 74. The cooled recycle fluid stream 82 is ducted to a fan which provides the required energy to produce and maintain the recycle fluid flow cycle. It must overcome all duct pressure losses the pressure loss heat extraction device 76 creates in the fluid recycle stream. The fan must provide sufficient increase in static pressure to cause the desired flow quantity to enter the air preheater inlet duct 26. While not shown, it is obvious that moving the fan upstream of the heat extraction device 76 will also provide the needed pressure increase, and not deviate from desired benefits of the new system. However, since the fluid temperature is hotter in flow 74 then in recycle fluid flow 82, more fan power would be consumed and is therefore not desirable.

Heat extraction device 76 may be a waste heat boiler, a water heater, or the evaporation portion of a low temperature electric power generation system. In a preferred embodiment, the heat is removed in the evaporator portion of a low temperature electric power generation system such as an Organic Rankine Power Cycle (ORC) using a lower temperature liquid such as toluene. This embodiment provides additional electrical power to existing power stations. The amount of fluid removed from the air preheater air outlet is equal to that returned to the air preheater air inlet. When additional thermal energy recovery is desired from the utility steam generator, the recycle fluid flow is routed to a heat extraction device prior to returning it to the regenerative air preheater. When additional drying capacity is desired, the recycle fluid flow may be introduced without removing heat (no heat extraction device). Alternatively, the heat extraction device is sized to leave sufficient heat in the recycle fluid flow such that its introduction to the inlet of the regenerative air preheater provides the desired additional drying capacity.

It must be understood that the heat extraction devices as listed herein are for illustration purposes only and it should be readily apparent to those of ordinary skill in the art that heat extraction device 76 could be any heat extraction device depending on the individual plant or site needs for example, low pressure steam, hot thermal fluids such as oils or hot water could be generated and used for district heating, greenhouse heating, or other industrial processes. It should be understood that each of the embodiments of the present invention can be made with or without a heat extraction device 76.

Figure 7:
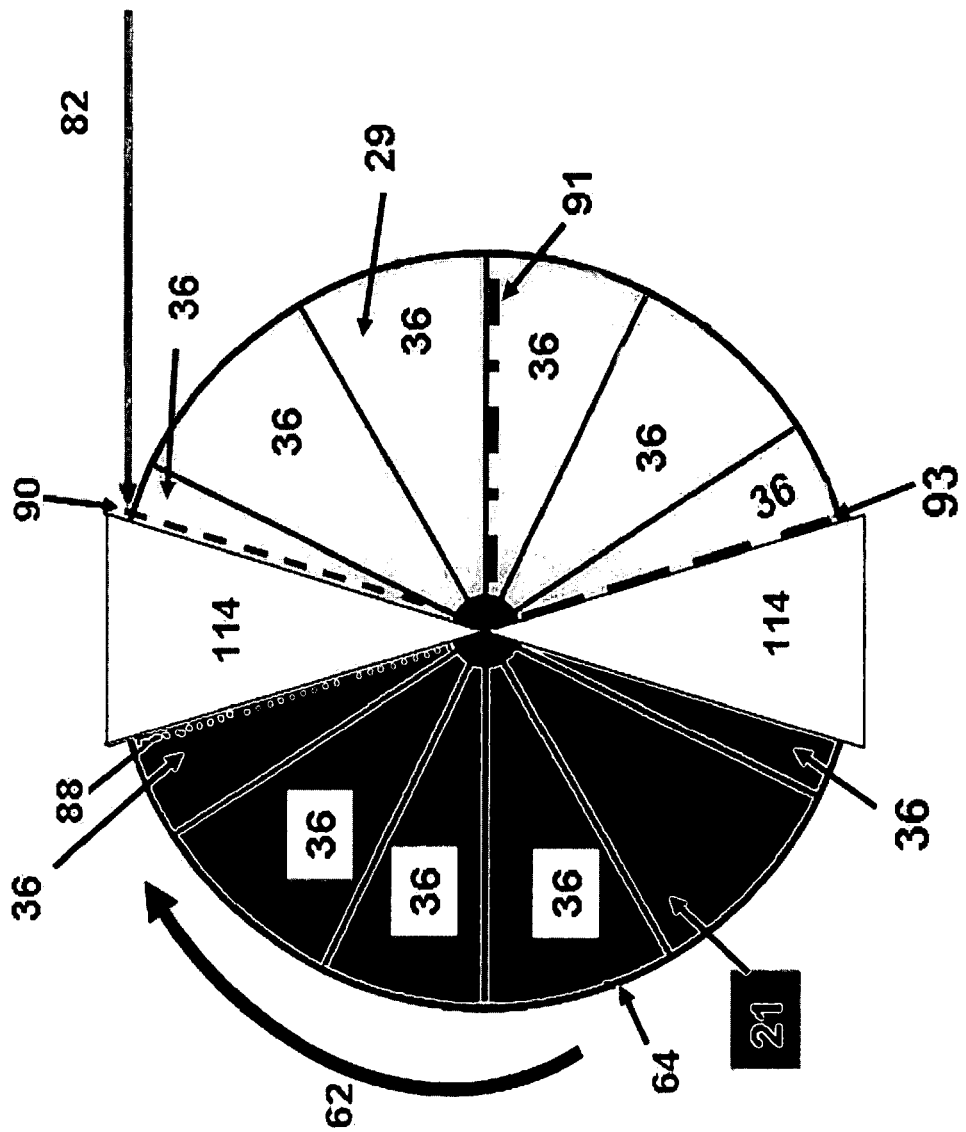
FIG. 7 is a generalized bottom perspective view of the rotor of a bisector air preheater depicting the entry location of the recycle fluid flow.

FIG. 7 is a bottom perspective view of the rotor of a bisector air preheater as shown in FIG. 1 depicting the entry location of the recycle fluid flow as shown in FIGS. 5 and 6. To achieve a significant temperature increase in primary air flow 23, recycle fluid flow 82 is introduced at the location where the element sheets first rotate into the air side from the gas side. Rotation arrow 62 shows that rotor 64 rotates from the hot gas side to the air side and thus produces the hottest element sheets at location 88, just prior to exiting the gas side. To produce maximum boiler thermal efficiency, the recycle fluid flow 82 should have a low level of mixing with the air inlet flow 24. The rotating elements should be exposed to the low temperature of the air inlet flow 24 for a significant portion of time prior to their entering the gas side. If mixing is allowed and the temperature of the air inlet flow 24 is increased, the amount of energy recovered from the flue gas will decrease due to the reduced temperature head between the gas in and air in temperature. The preferred and best location for introduction of the recycle fluid flow 82 into a sector 36 is at approximately location 90 as each sector 36 is first rotated into the air side of the system. Location 90 is where the hot end element sheets are at their highest temperature. FIG. 7 illustrates the rotor of an air preheater with about five sectors 36 in air side 29. When the recycle fluid flow 82 is introduced at location 90, the heat gained at the cold end of the element sheets from exposure to the hot recycle fluid flow 82, is removed by exposure to the air inlet flow 24, prior to entering the gas side 21 at location 93. Introduction of recycle fluid flow 82 at location 90 provides the maximum time exposure for the elements to "see" the air inlet flow 24 which is the coldest temperature flow.

In another preferred embodiment of the present invention, as the rotor rotates, recycle fluid flow 82 is directed to re-enter the rotor on the air side in a range of other positions in a quadrant of the air side of the rotor closest to the sector of the rotor entering the air side from the gas side. The quadrant of the air side where recycle fluid flow 82 is directed is between location 90 (where the elements first enter the air side; where the elements are at the hottest temperature) and location 91, (half way through the rotational position within the air side 29). Recycle fluid flow 82 enters the preheater separately from the flow of cool air of air inlet flow 24 and is prevented from substantially mixing with air inlet flow 24. The flow of cool air enters the regenerative air preheater in a quadrant of the air side of the rotor farthest from the sector of the rotor entering the air side. The quadrant of the air side where air inlet flow 24 is directed is between location 93 (where the elements are about to leave the air side; the location that the elements are at the coolest temperature) and location 91, (half way through the rotational position within the air side 29). The minimization of mixing produces minimal reduction in temperature head. The introduction of recycle fluid flow 82 to the rotor at any location between location 90 and location 91 would require a more costly installation to substantially prevent mixing of the recycle fluid flow 82 and the air inlet flow 24. Again while not optimal, there may be site specific reasons for selecting a recycle fluid flow introduction location slightly different than location 90, such as for example, when space constraints or interference exists such as support steel interference with introduction location 90.

When the recycle fluid flow 82 is introduced into air side 29, and the air preheater has no sector or sealing plate, the pressure drop through the elements exposed to recycle fluid flow 82 and any small mixing component from air inlet flow 24 must be the same as for the remainder of air inlet flow 24 in the other sector portions of the rotor. The recycle fluid is introduced to the element sheets at a location selected which allows maximum exposure while they are at a high temperature and air inlet flow 24 to be exposed to the coldest elements for a maximum time on the air side. While a sector plate of some width could be placed between the recycle fluid flow 82 and air inlet flow 24, it would create additional pressure drop and does not offer appreciable benefits. If so added the overall system concept and benefits would still remain as disclosed.

To achieve essentially the full benefits of the preferred embodiment of this invention it is not necessary to distribute the flow over the complete radius. The innermost portion of the rotor provides only a small amount of area and may be exposed to air inlet flow 24. In another embodiment of the invention a flow header pipe with a distribution of holes along its length is used as a means to achieve the desired introduction of the recycle fluid flow 82 into the rotor. A flow header pipe need not extend to the innermost portion of the rotor. If a header pipe is placed in close proximity to the cold end rotor face, recycle fluid flow is added through multiple holes along the header pipe's length to distribute flow along the rotor radius, and recycle fluid flow is introduced at any location between location 90 and 91 with limited and acceptable mixing of recycle fluid flow 82 and air inlet flow 24. A simple single point penetration of the appropriate air inlet duct at the desired location will suffice if internal baffles are utilized to maintain substantial separation of the recycle fluid flow 82 from air inlet flow 24. Other options are available and can be envisioned by one skilled in the art.

Figure 8:
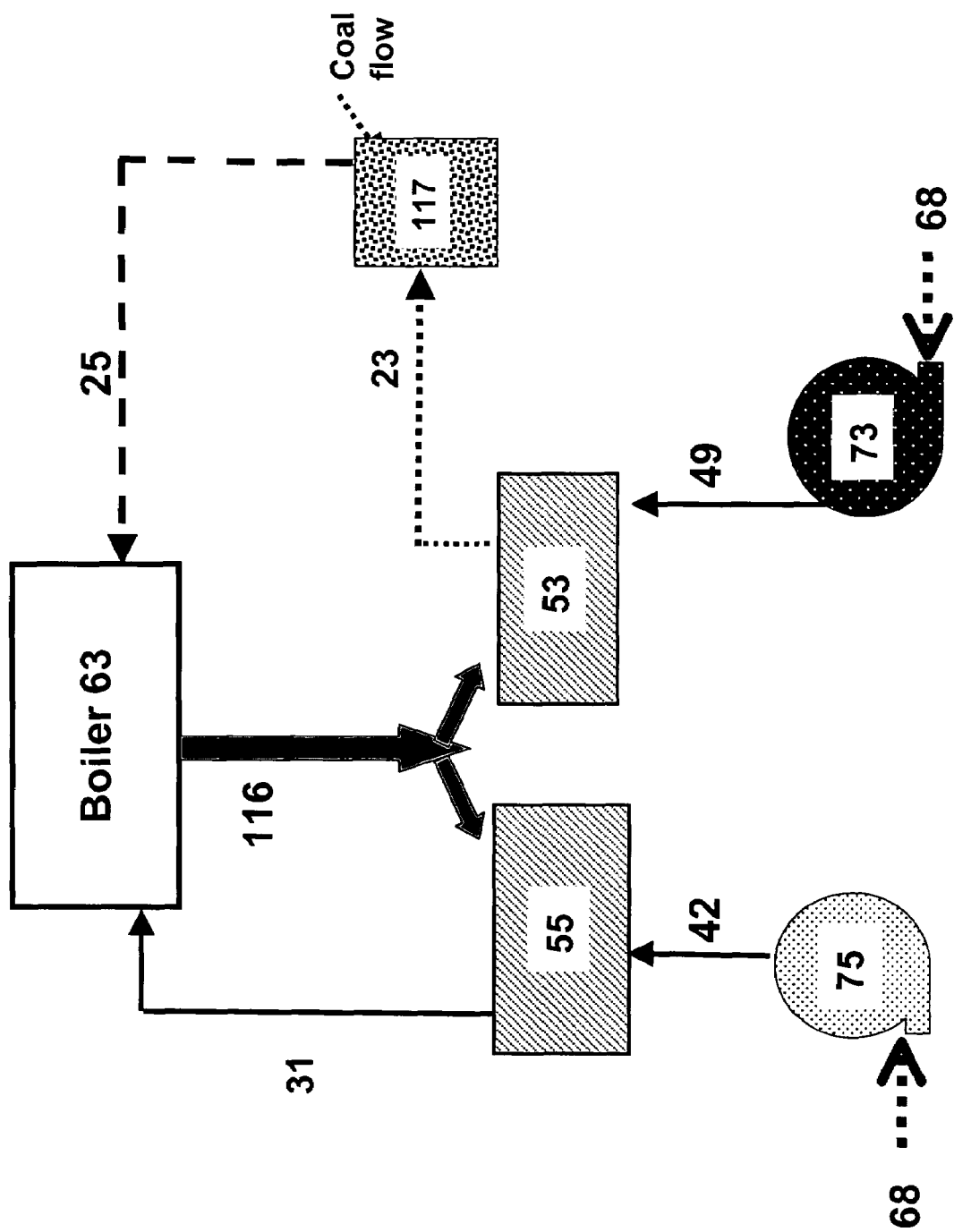
FIG. 8 is a flow schematic showing of a conventional art boiler utilizing two bisector air preheaters, and a pressurized pulverizer.

It is typical in the industry to equip boiler 63 with two or more bisector regenerative air preheater systems. FIG. 8 depicts a flow schematic of two bisector preheaters used in conjunction with a conventional boiler 63 equipped with a pulverizer 117, operating under positive pressure. This boiler arrangement utilizes two fans, one a higher pressure primary air fan 73, and a lower pressure secondary air fan 75. Primary air fan 73 provides primary air inlet flow 49 to primary air preheater rotor 53. After flowing through primary air preheater rotor 53 and absorbing heat, the primary air flow 23 goes to pulverizer 117 where it both dries the coal and transports the coal to boiler 63. Pulverizer exhaust flow 25 enters boiler 63 in the burners where it provides both the fuel and combustion air required for initial combustion. A second part of combustion air 68 feeds secondary air fan 75 and goes to secondary air preheater rotor 55 as secondary air inlet flow 42. After absorbing heat, secondary air flow 31 goes to the burners of boiler 63 to complete combustion.

Figure 9:
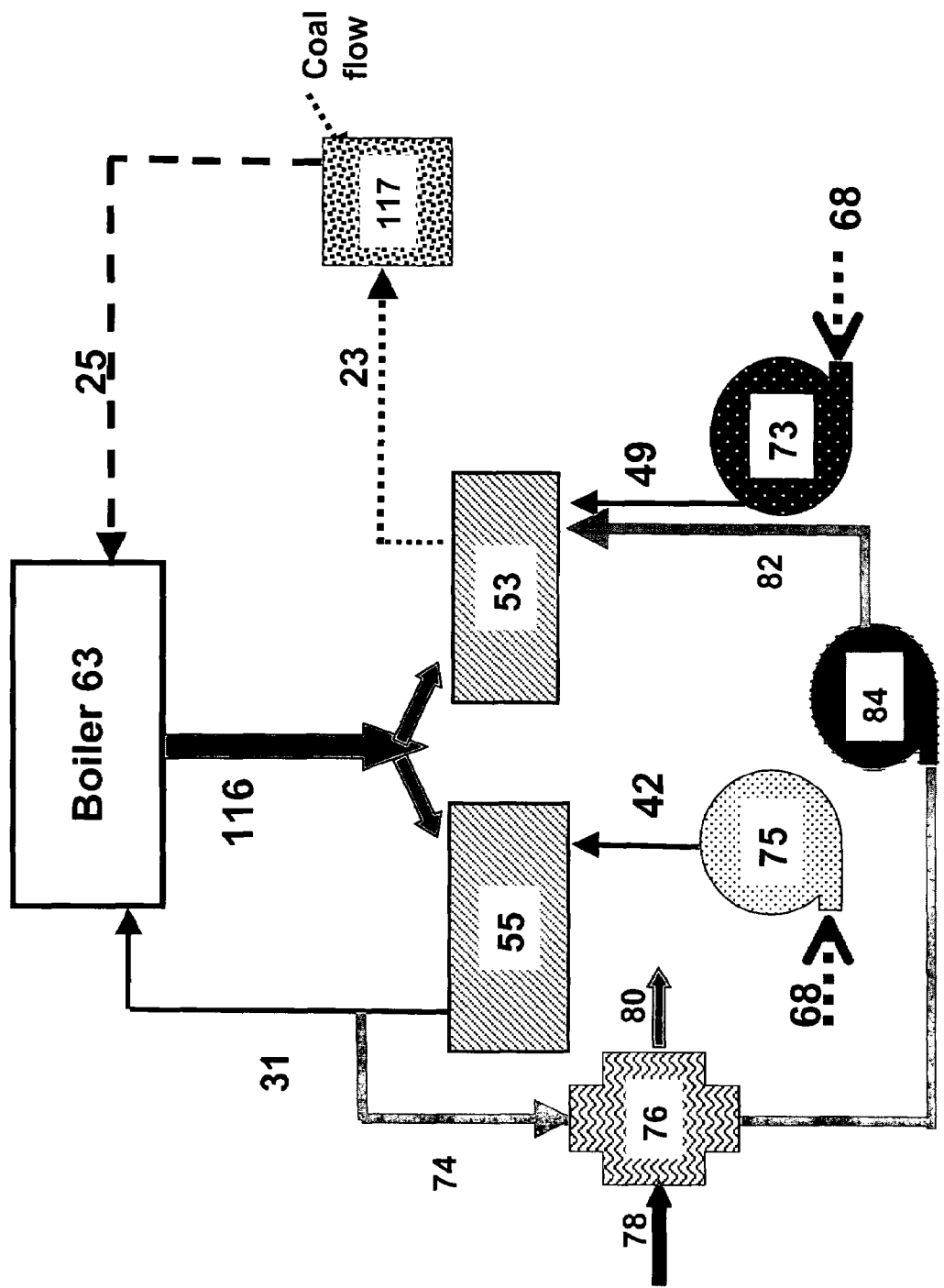
FIG. 9 is a flow schematic showing another embodiment of a closed loop recycle fluid flow system of the present invention as applied to a boiler with a bisector primary air preheater and bisector secondary air preheater.

FIG. 9 is a flow schematic showing another embodiment of a closed loop recycle fluid flow system of the present invention as applied to a boiler with a bisector primary air preheater and bisector secondary air preheater. Gas outlet flow 116 from boiler 63 is split and provided proportionally as required to bisector air preheaters (secondary air preheater rotor 55 and primary air preheater rotor 53). Secondary air preheater rotor 55 is provided secondary air inlet flow 42, by secondary air fan 75 which pressurizes combustion air 68, and provides the required flow needed to complete combustion of the coal in boiler 63.

Primary air fan 73 pressurizes combustion air 68 and provides primary air inlet flow 49 to primary air preheater rotor 53. Primary air flow 23 exits the primary air preheater rotor and flows to pulverizer 117.

In this embodiment of the present invention, flow 74 is removed from the secondary air out flow 31, and induced to flow through heat extraction device 76. (It should be readily apparent to one skilled, flow 74 may also be removed in part or in whole from the primary air flow 23.) Flow 74 is ducted to recycle fluid flow fan 84 and returned to the primary air preheater rotor 53. Flow 74 is ducted to recycle fluid flow fan 84 and it is returned to the air preheater via recycle fluid flow 82 where it is introduced into the rotor on the air side at a location near where the element sheets first rotate into the air side from the gas side so as to achieve a significant temperature increase in primary air flow 23. When recycle fluid flow 82 is added with the normal flow into the rotor, the pressure drop will increase in the rotor it flows through. It should be understood by one skilled in the art that there may be site specific fan limitations which would favor routing some or all of recycle fluid flow 82 to secondary air preheater rotor 55. When a portion of recycle fluid flow 82 is directed to primary air preheater rotor 53 an increase in the pulverizer drying capacity results. One skilled in the art will appreciate that it is possible to introduce recycle fluid flow 82 in several locations, and with various quantities to each, dependent on site requirements to increase the drying capacity of the pulverizer 117.

FIG. 9 further illustrates the recovery of additional energy with heat extraction device 76. A similar system could be applied to such a two bisector air preheater boiler system without heat extraction device 76. An implementation of an embodiment of the present invention without a heat extraction device would result in an increased drying capacity of the pulverizer.

Figure 10:
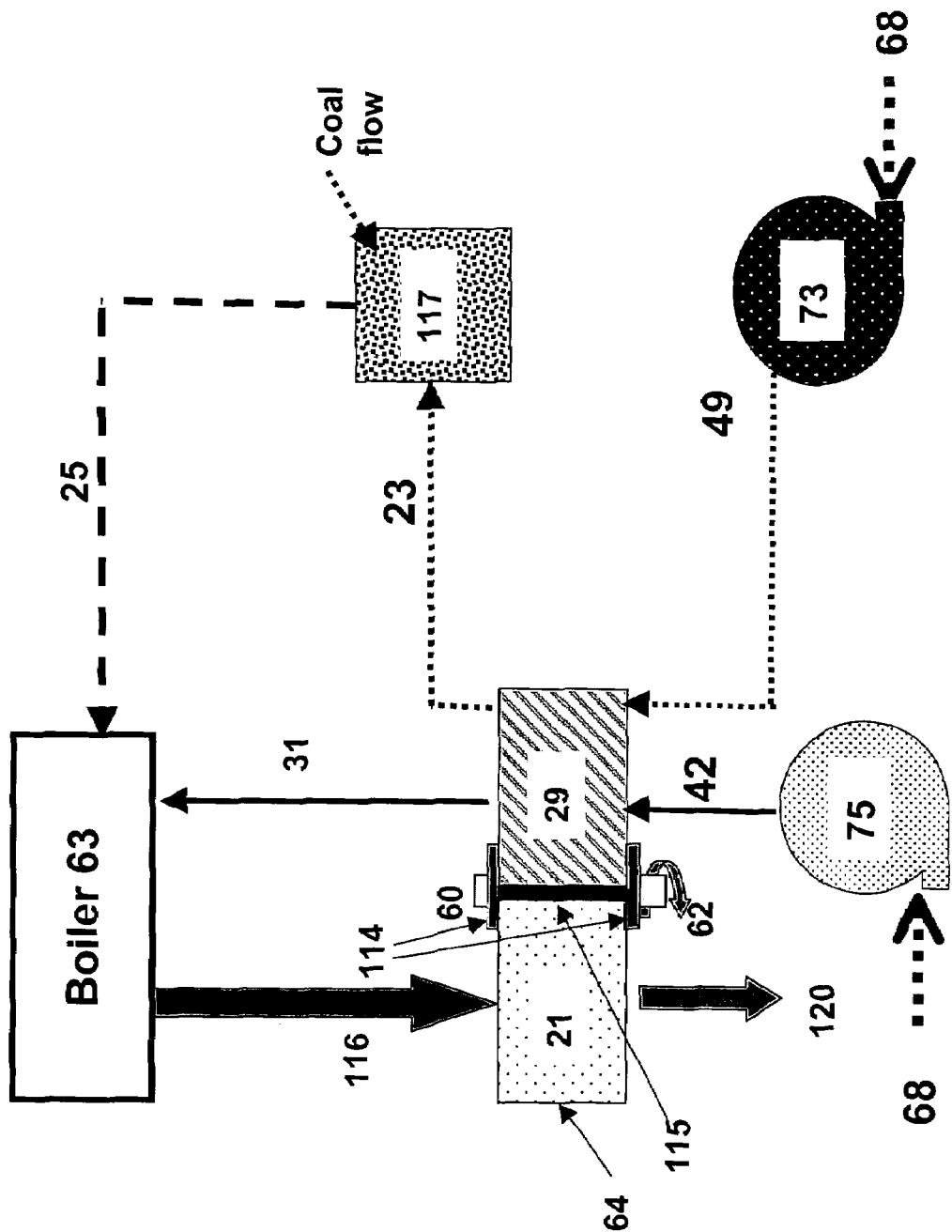
FIG. 10 is a flow schematic showing a conventional art boiler utilizing a trisector air preheater and a pressurized pulverizer.

FIG. 10 shows another typical arrangement including a trisector air preheater commonly used in many coal-fired steam generating plants wherein boiler 63 is equipped with pulverizer 117, operating under positive pressure, and a trisector air preheater as described in FIG. 2. The boiler arrangement utilizes two fans, one a higher pressure primary air fan 73, and a lower pressure secondary air fan 75. Primary air fan 73 provides primary air inlet flow 49 to rotor 64. After absorbing heat, primary air flow 23 goes to pulverizer 117 where it both dries the coal and transports the coal to boiler 63. A second part of combustion air 68 feeds secondary air fan 75 and which also goes to rotor 64 as secondary air inlet flow 42. After absorbing heat, secondary air flow 31 is directed to the burners (not shown) of boiler 63 to complete combustion. The sector plates (shown in FIG. 2) substantially separate the two air flows. As with the other regenerative air preheater and boiler arrangements (shown in FIG. 3 and FIG. 8) more than one trisector air preheater is often utilized in the industry in conjunction with boiler 63.

Figure 11:
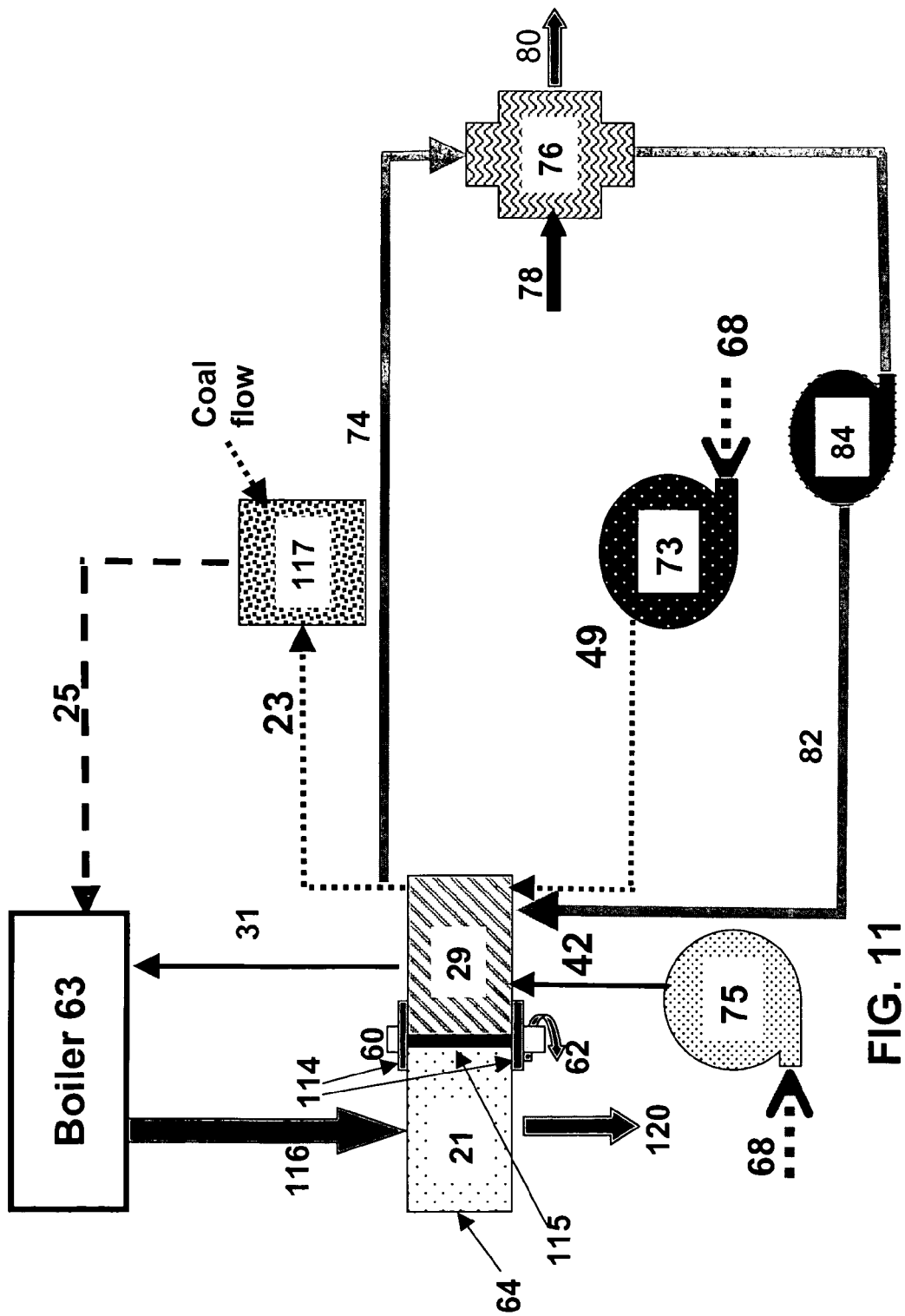
FIG. 11 is a flow schematic showing another embodiment of a closed loop recycle fluid flow system of the present invention as applied to a boiler with a trisector air preheater.

FIG. 11 is a flow schematic showing another embodiment of a -closed loop recycle fluid flow system of the present invention as applied to a boiler with a trisector air preheater. Combustion air flow 68 is provided to both a secondary air fan 75, and a primary air fan 73. Secondary air inlet flow 42 and primary air inlet flow 49 are directed to portions of the rotor 64. Recycle fluid flow 82 is introduced into the rotor on the air side at a location near where the element sheets first rotate into the air side from the gas side so as to achieve a significant temperature increase in primary air flow 23. When recycle fluid flow 82 is added with the normal flow into the rotor, the pressure drop will increase in the rotor side it flows through. One skilled in the art will appreciate that it is possible to introduce recycle fluid flow 82 in a proximate location to primary air inlet flow 49 within the rotor without substantially mixing primary air inlet flow 49 and recycle fluid flow 82. When a portion of recycle fluid flow 82 is directed to the air preheater rotor without substantially mixing with primary air inlet flow 49 an increase in the pulverizer drying capacity results.

Figure 12:
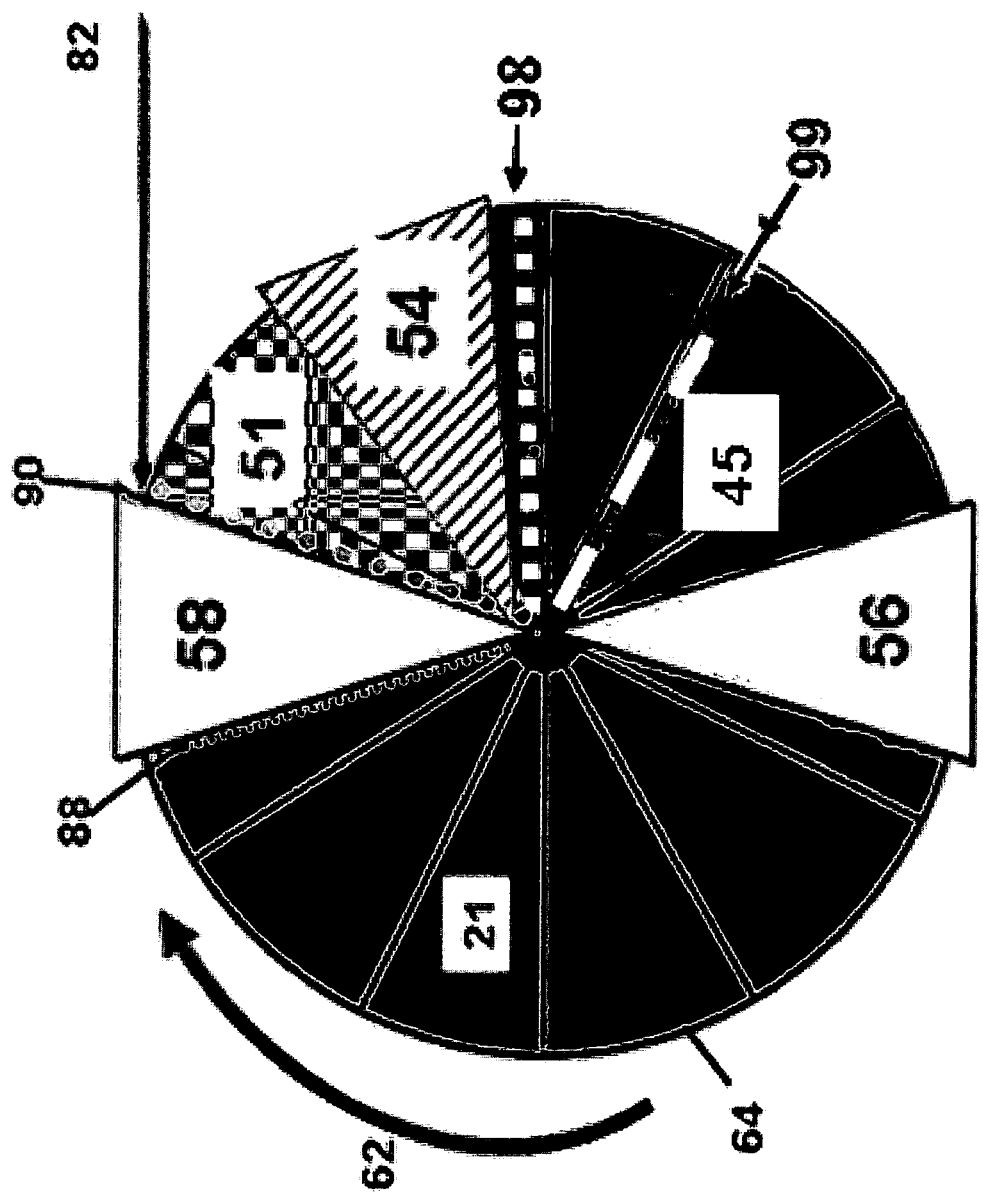
FIG. 12 is a generalized bottom perspective view of the rotor of a trisector air preheater with a typical air preheater rotation arrangement depicting the entry location of the recycle fluid flow of the present invention.

FIG. 12 is a bottom perspective view of the rotor of a trisector air preheater with a typical air rotation arrangement depicting the entry location of the recycle fluid flow of the present invention. It shows the most typical rotation arrangement in the industry, from gas side 21 to primary air side 51 and then to secondary air side 45. This rotation arrangement provides the hottest primary air temperature. PS sector plate 54 located between primary air side 51, and secondary air side 45 provides sealing between the primary and secondary air flows. On a trisector air preheater with this rotation direction, recycle fluid flow 82 will most often be introduced into primary air side 51. Avoiding mixing of recycle fluid flow 82 with primary air inlet flow 49 is beneficial but not as important as with the bisector embodiment or that of the trisector with recycle fluid flow 82 introduction into secondary air side 45. This is true since the primary air side 51 typically consists of only a few sectors, and is a small percentage of the face area of rotor 64.

In an alternative embodiment of the present invention on a trisector air preheater with rotor rotation from gas side 21 to primary air side 51 and then to secondary air side 45, recycle fluid flow 82 is introduced into a sector 36 that that is proximate location 98 as each sector 36 is first rotated into the secondary air flow. Introducing recycle fluid flow 82 at approximately location 98 allows an increase in the incremental thermal energy recovered by the regenerative air preheater from that of the system prior to modification, but does not increase the temperature of primary air 23 and does not maximize the amount of additional energy recovered. Plant space restrictions or other factors might dictate this option, but it would normally not be the preferred embodiment. As with the bisector arrangement, the implementations allow for different introduction locations for the recycle fluid flow, depending on the need for increased pulverizer drying capacity, or increased pulverizer drying capacity and increased heat recovery. In another embodiment, recycle fluid flow 82 is introduced into the bottom of the rotor on the air side within the continuous range of positions between location 98 (where the elements first enter the secondary air side 45) and location 99, (through the rotational position under the SG sector plate 56) as long as the recycle fluid flow 82 is not allowed to substantially mix with secondary inlet flow 42. Flow impacts to air preheater pressure drops may dictate the introduction location of recycle fluid flow 82. In some cases introduction into both the primary air side 51 and the secondary air side 45 may be selected based on said pressure drop limitations and desired system improvement goals.

Figure 13:
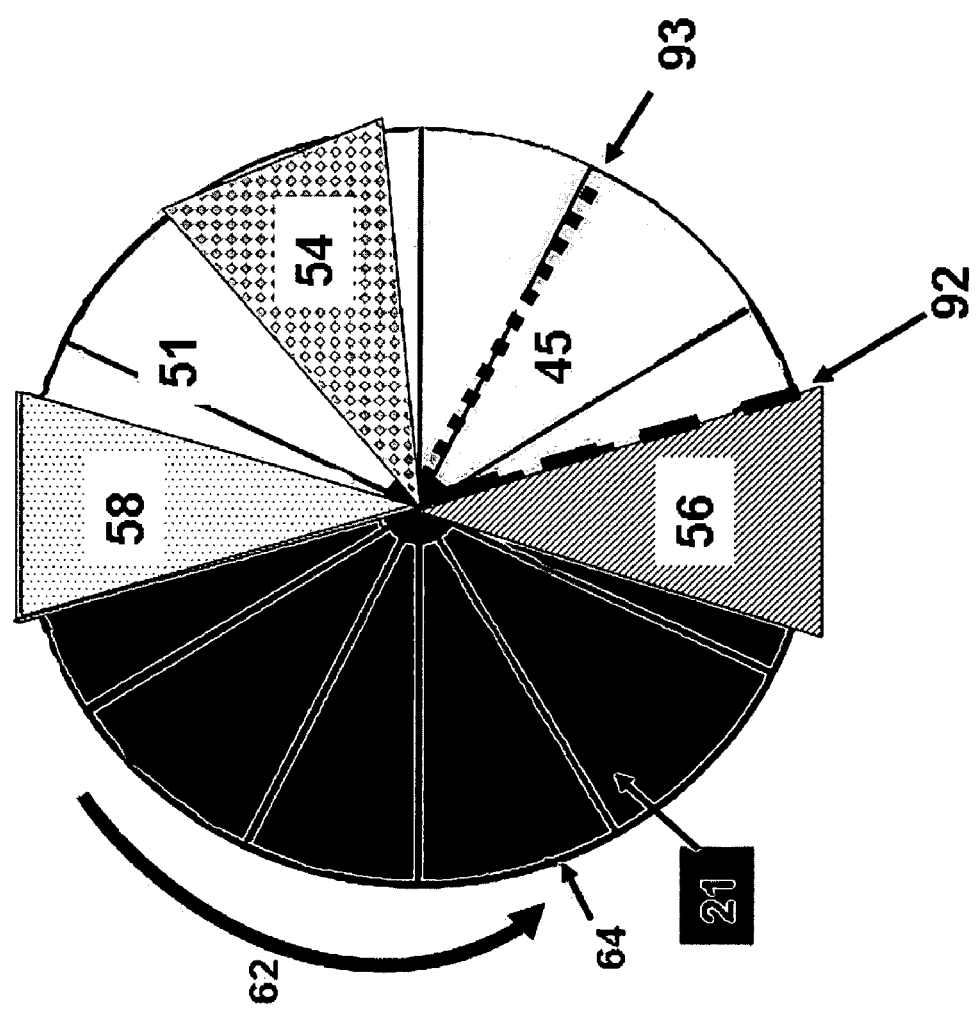
FIG. 13 is a generalized bottom perspective view of the rotor a trisector air preheater with an alternative air preheater rotation arrangement depicting the entry location of the recycle fluid flow of the present invention.

FIG. 13 is a bottom perspective view of the rotor a trisector air preheater as shown in FIG. 2 depicting the entry location of the recycle fluid flow 82 (as shown in FIG. 11) with an alternative air rotation arrangement of the rotor. In an alternative embodiment of the present invention used in conjunction with a trisector air preheater with rotor rotation from gas side into secondary air side 45, recycle fluid flow 82 is preferentially introduced into a sector 36 that is proximate location 92 (where the element sheets first leave the sector plate separating the gas from the secondary air) adjacent SG sector plate 56. In another embodiment, recycle fluid flow 82 is introduced below the rotor in the secondary air side 45 within the continuous range of positions between locations 92 and 93 within secondary air side 45. The continuous range between locations 92 and 93 is within the first half of the rotational positions from the place where the elements first enter the secondary air side 45, until they rotate under the SP sector plate 54.

While introducing recycle fluid flow 82 into the secondary air side 45 eliminates the benefit of increased pulverizer drying capacity, the rotation direction shown in FIG. 13, indicates no deficiency in pulverizer drying capacity. The air preheater rotation can be changed from this design to that of the gas to primary air whenever more air temperature is needed for coal drying, therefore if it has not been done so, there is likely no need for additional energy for coal drying.

As will be appreciated, the present invention provides an improved steam generator system that eliminates the continuous excess air discharge and it's emissions to the environment. The invention overcomes some of the deficiencies in the prior art by providing a steam generator system that uses a recycle fluid flow wherein hot air exiting the regenerative air preheater is routed to the inlet of the regenerative air preheater.

While a preferred form of this invention has been described above and shown in the accompanying drawings, it should be understood that applicant does not intend to be limited to the particular details described above and illustrated in the accompanying drawings. In this regard, the term "means for" as used in the claims is intended to include not only the designs illustrated in the drawings of this application and the equivalent designs discussed in the text, but it is also intended to cover other equivalents now known to those skilled in the art, or those equivalents which may become known to those skilled in the art in the future. Thus, it is seen that the objects of the invention are efficiently obtained. It will be understood that the foregoing description is illustrative of the invention and should not be considered as limiting and that other embodiments of the invention are possible without departing from the invention's spirit and scope.

What is claimed is:

1. A steam generator system comprising a coal-fired steam generator in fluid communication with a regenerative air preheater; said steam generator being adapted to receive a flow of heated combustion air exiting from said regenerative air preheater and to discharge a flow of hot flue gas to said regenerative air preheater;
   said regenerative air preheater adapted to receive a flow of cool air in counter flow to said flow of hot flue gas and to provide a heat exchange between said cool air and said hot flue gas to convert said cool air into said heated combustion air exiting to said steam generator;
   said steam generator system further comprising a first flow of heated air, routed through a source of pulverized coal to form a mixture comprising heated air and pulverized coal; said mixture being directed to said steam generator for combustion therein; and
   a recycle fluid flow consisting of an additional flow of air not required for combustion, diverted from the total air leaving said regenerative air preheater, directed by means of a fan to re-enter said regenerative air preheater at a location substantially separate from where said flow of cool air is received in said regenerative air preheater to be further heated therein and exit as part of the total flow leaving the regenerative air preheater.

2. A steam generator system according to claim 1 wherein said regenerative air preheater is a bisector air preheater further comprising a rotor operatively arranged to rotate, separated into sectors having a first sector plate and an opposing second sector plate positioned between a gas side and an air side of said rotor.

3. A steam generator system according to claim 2 wherein said recycle fluid flow re-enters said regenerative air preheater in sectors in a quadrant of said air side of said rotor closest to a sector of said rotor entering said air side from said gas side; and
   said flow of cool air enters sectors of said regenerative air preheater substantially separate from said sectors said recycle fluid flow re-enters said regenerative air preheater.

4. A steam generator system according to claim 3 wherein said recycle fluid flow re-enters said regenerative air preheater in a region proximate to said sector of said rotor entering said air side from said gas side as said rotor rotates.

5. A steam generator system according to claim 1 wherein a flow header pipe with a distribution of holes along its length is used as a means to direct said recycle fluid flow into the regenerative air preheater.

6. A steam generator system according to claim 1 wherein said recycle fluid flow of heated air is directed first through a heat extraction device.

7. A steam generator system according to claim 6 wherein said heat extraction device is a heat exchanger for heat exchange therein with a lower temperature fluid.

8. A steam generator system according to claim 6 wherein said heat extraction device is a component in an electric power generation system.

9. A steam generator system according to claim 1 further comprising a second regenerative air preheater in fluid communication with said coal-fired steam generator; said steam generator being adapted to receive a flow of heated combustion air exiting from each of said regenerative air preheater and said second regenerative air preheater and to discharge a flow of hot flue gas to each of said regenerative air preheater and said second regenerative air preheater;
   each of said regenerative air preheater and said second regenerative air preheater being adapted to receive a flow of cool air in counter flow to said flow of hot flue gas and to provide a heat exchange between said cool air and said hot flue gas to convert said cool air into said flow of heated combustion air exiting to said steam generator;
   said steam generator system further comprising a first flow of heated air, said flow of combustion air exiting said regenerative air preheater and routed through a source of pulverized coal to form a mixture comprising heated air and pulverized coal said mixture being directed to said steam generator for combustion therein; and
   wherein said steam generator system further comprising a second flow of heated air routed to the combustion process within the steam generator; and a recycle fluid flow of air not required for combustion, diverted from flow of heated air and directed to enter said regenerative air preheater or said second regenerative air preheater or both.

10. A steam generator system comprising a coal-fired steam generator in fluid communication with a regenerative air preheater; said steam generator being adapted to receive a flow of heated combustion air exiting from said regenerative air preheater and to discharge a flow of hot flue gas to said regenerative air preheater;
    said regenerative air preheater adapted to receive a flow of cool air in counter flow to said flow of hot flue gas and to provide a heat exchange between said cool air and said hot flue gas to convert said cool air into said heated combustion air exiting to said steam generator;
    said steam generator system further comprising a first flow of heated air, routed through a source of pulverized coal to form a mixture comprising heated air and pulverized coal; said mixture being directed to said steam generator for combustion therein; and a recycle fluid flow consisting of an additional flow of air not required for combustion, diverted from the total air leaving said regenerative air preheater, directed by means of a fan to re-enter said regenerative air preheater at a location substantially separate from where said flow of cool air is received in said regenerative air preheater to be further heated therein and exit as part of the total flow leaving the regenerative air preheater;

wherein said recycle fluid flow of heated air is directed first through a heat extraction device for heat exchange therein with a lower temperature fluid, and then directed to either said regenerative air preheater or said second regenerative air preheater to be further heated therein and exit as said flow of heated combustion air.

11. A steam generator system according to claim 10 wherein said heat extraction device is a heat exchanger for heat exchange therein with a lower temperature fluid.

12. A steam generator system according to claim 10 wherein said heat extraction device is a component in an electric power generation system.

13. A steam generator system according to claim 9 wherein said regenerative air preheater is a trisector and said second regenerative air preheater is a trisector.

14. A steam generator system according to claim 9 wherein said regenerative air preheater is a bisector and said second regenerative air preheater is a bisector.

15. A steam generator system according to claim 1 wherein said regenerative air preheater is a trisector air preheater comprising a rotor having a gas side and an air side with a first sector plate and an opposing second sector plate positioned therebetween; and a third sector plate positioned between a secondary air side and a primary air side of said rotor;

wherein at least a portion of said recycle fluid flow re-enters said regenerative air preheater in a region proximate to said sector of said rotor entering said air side from said gas side when said rotator is rotated.

16. A steam generator system according to claim 15 wherein said recycle fluid flow of heated air is directed through a heat extraction device prior to reentering said regenerative air preheater.

17. A steam generator system according to claim 16 wherein said heat extraction device is a heat exchanger for heat exchange therein with a lower temperature fluid.

18. A steam generator system according to claim 17 wherein said heat extraction device is a component in an electric power generation system.

\* \* \* \* \*